US010321076B2

(12) United States Patent
Grigorian et al.

(10) Patent No.: US 10,321,076 B2
(45) Date of Patent: Jun. 11, 2019

(54) IMAGING DEVICE WITH SHUTTER PROVIDING PARTIAL ATTENUATION

(71) Applicant: FLIR Systems, Inc., Wilsonville, OR (US)

(72) Inventors: Sam Grigorian, Fresno, CA (US); Nicholas Högasten, Santa Barbara, CA (US); Pierre Boulanger, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/710,729

(22) Filed: Sep. 20, 2017

(65) Prior Publication Data

US 2018/0027198 A1 Jan. 25, 2018

Related U.S. Application Data

(63) Continuation of application No. PCT/US2016/027954, filed on Apr. 15, 2016.
(Continued)

(51) Int. Cl.
*H04N 5/365* (2011.01)
*H04N 5/225* (2006.01)
(Continued)

(52) U.S. Cl.
CPC ......... *H04N 5/3651* (2013.01); *H04N 5/2254* (2013.01); *H04N 5/2353* (2013.01);
(Continued)

(58) Field of Classification Search
CPC .. H04N 5/2254; H04N 5/232; H04N 5/23212; H04N 5/23216; H04N 5/23258;
(Continued)

(56) References Cited

U.S. PATENT DOCUMENTS 5,181,118 A * 1/1993 Kimura ............... H04N 1/401
348/243
8,379,131 B2 * 2/2013 Minakuti ............. H04N 5/217
348/222.1
(Continued)

FOREIGN PATENT DOCUMENTS

EP 0447871 9/1991
EP 0683606 11/1995
WO WO 99/17542 4/1999

*Primary Examiner* — Lin Ye
*Assistant Examiner* — Chriss S Yoder, III
(74) *Attorney, Agent, or Firm* — Haynes and Boone, LLP

(57) ABSTRACT

A partially attenuating shutter may be used to identify and reduce fixed pattern noise (FPN) associated with imaging devices. In one example, a system includes an image capture component configured to capture images in response to incident radiation from a scene along an optical path. The system includes a shutter configured to attenuate a first portion of the incident radiation and permit a second portion of the incident radiation to pass. The system also includes an actuator configured to translate the shutter between an open position out of the optical path, and a closed position in the optical path between the scene and the image capture component. The system also includes a processor configured to determine a plurality of FPN correction terms using images captured by the image capture component while the shutter is in the open and closed positions. Related systems and methods are also provided.

20 Claims, 9 Drawing Sheets

Related U.S. Application Data

(60) Provisional application No. 62/149,439, filed on Apr. 17, 2015.

(51) Int. Cl.
  *H04N 5/232* (2006.01)
  *H04N 5/235* (2006.01)
  *H04N 5/33* (2006.01)

(52) U.S. Cl.
  CPC ......... *H04N 5/23258* (2013.01); *H04N 5/332* (2013.01); *H04N 5/3656* (2013.01); *H04N 5/3658* (2013.01)

(58) Field of Classification Search
  CPC .. H04N 5/23293; H04N 5/235; H04N 5/2353; H04N 5/332; H04N 5/3651; G03B 9/08–54; G03B 9/64
  See application file for complete search history.

(56) References Cited

U.S. PATENT DOCUMENTS

| | | | |
|---|---|---|---|
| 8,432,466 B2* | 4/2013 | Kwan | G06T 5/50 348/277 |
| 2004/0005086 A1* | 1/2004 | Wolff | G06K 9/00228 382/118 |
| 2011/0221908 A1* | 9/2011 | Hoelter | B29C 43/36 348/164 |

* cited by examiner

IMAGING DEVICE WITH SHUTTER PROVIDING PARTIAL ATTENUATION

CROSS-REFERENCE TO RELATED APPLICATIONS

This application is a continuation of International Patent Application No. PCT/US2016/027954 filed Apr. 15, 2016 and entitled "IMAGING DEVICE WITH SHUTTER PROVIDING PARTIAL ATTENUATION," which is incorporated herein by reference in its entirety.

International Patent Application No. PCT/US2016/027954 filed Apr. 15, 2016 claims priority to and the benefit of U.S. Provisional Patent Application No. 62/149,439 filed Apr. 17, 2015 and entitled "INFRARED IMAGING DEVICE WITH SEMI-TRANSPARENT SHUTTER," which is hereby incorporated by reference in its entirety.

TECHNICAL FIELD

One or more embodiments of the invention relate generally to imaging devices and more particularly, for example, to noise removal for imaging devices.

BACKGROUND

Imaging devices (e.g., thermal imagers such as thermal cameras or visible light images such as visible light cameras) typically include a plurality of sensors arranged in rows and columns of pixels. Images (e.g., image frames) captured by the sensors often suffer from various types of noise. For example, fixed pattern noise (FPN) may appear in the captured images and may persist in a pattern that remains relatively constant over multiple images.

FPN is conventionally detected using an opaque shutter implemented as a substantially uniform black body. The opaque shutter may be temporarily introduced in front of the sensors which capture images of the opaque shutter. FPN can be identified by the deviations from an expected uniform black body response in the captured images. Following such capture, the opaque shutter is moved out of the sensors' field of view. These FPN detections may be repeated, as FPN can slowly change over time in response to external and internal thermal conditions.

Unfortunately, this conventional approach requires the sensors to be blocked from viewing an external scene while the opaque shutter is in place. As a result, the sensors are prevented from capturing any images of the scene during FPN detection. Moreover, these disruptions repeat each time a new FPN detection occurs. As a result, there may be multiple time periods during which no scene information is available to the imager. This is problematic, especially for security and mission critical applications where even brief scene interruptions may result in important image data being lost.

Although some conventional shutters are capable of being quickly deployed, such implementations typically require expensive and heavy components to achieve rapid movement. Moreover, scene information will still be interrupted for periods of time while the shutter is in place.

SUMMARY

In various embodiments, a partially attenuating shutter may be used to identify and reduce fixed pattern noise (FPN) associated with imaging devices. In one embodiment, a system includes an image capture component configured to capture images in response to incident radiation from a scene along an optical path; a shutter configured to attenuate a first portion of the incident radiation and permit a second portion of the incident radiation to pass; an actuator configured to translate the shutter between an open position out of the optical path, and a closed position in the optical path between the scene and the image capture component; and a processor configured to determine a plurality of FPN correction terms using images captured by the image capture component while the shutter is in the open and closed positions.

In another embodiment, a method includes receiving incident radiation from a scene along an optical path; translating a shutter between an open position out of the optical path and a closed position in the optical path between the scene and an image capture component, wherein the shutter is configured to attenuate a first portion of the incident radiation and permit a second portion of the incident radiation to pass; capturing, by the image capture component, images in response to the received incident radiation while the shutter is in the open and closed positions; and determining a plurality of FPN correction terms using the images.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided to identify and reduce fixed pattern noise (FPN) associated with imaging devices through use of a semi-transparent shutter. In the case of thermal imagers, FPN can be caused by various factors such as, for example, self-heating of infrared sensors, heat from electronics operating within an infrared imaging device, solar loading on external surfaces of an infrared imaging device, gradual deterioration infrared sensors and related components, and/or other factors. In many on these cases, FPN may be generally associated with the infrared imaging device itself or environmental factors that are not directly associated with a target scene to be imaged.

In accordance with various embodiments, an imaging device may be implemented with a semi-transparent shutter that attenuates (e.g., blocks) a portion of incident radiation received from the target scene, and also passes a remaining portion of the radiation. The shutter may be selectively translated between open and closed positions. In the open position, an image capture component captures thermal images of the scene without any interference by the shutter. In the closed position, the shutter is interposed (e.g., positioned) between the scene and the image capture component such that the image capture component captures attenuated images of the scene. By processing the open shutter images and the closed shutter images, FPN may be determined and corresponding FPN correction terms may be applied to the various images to substantially remove the FPN from the thermal images.

Although these various techniques will be discussed primarily in relation to thermal images and thermal imaging devices, the same or similar techniques may be used in relation to any desired radiation wavelengths (e.g., visible light images and visible light imaging devices).

Figure 1:
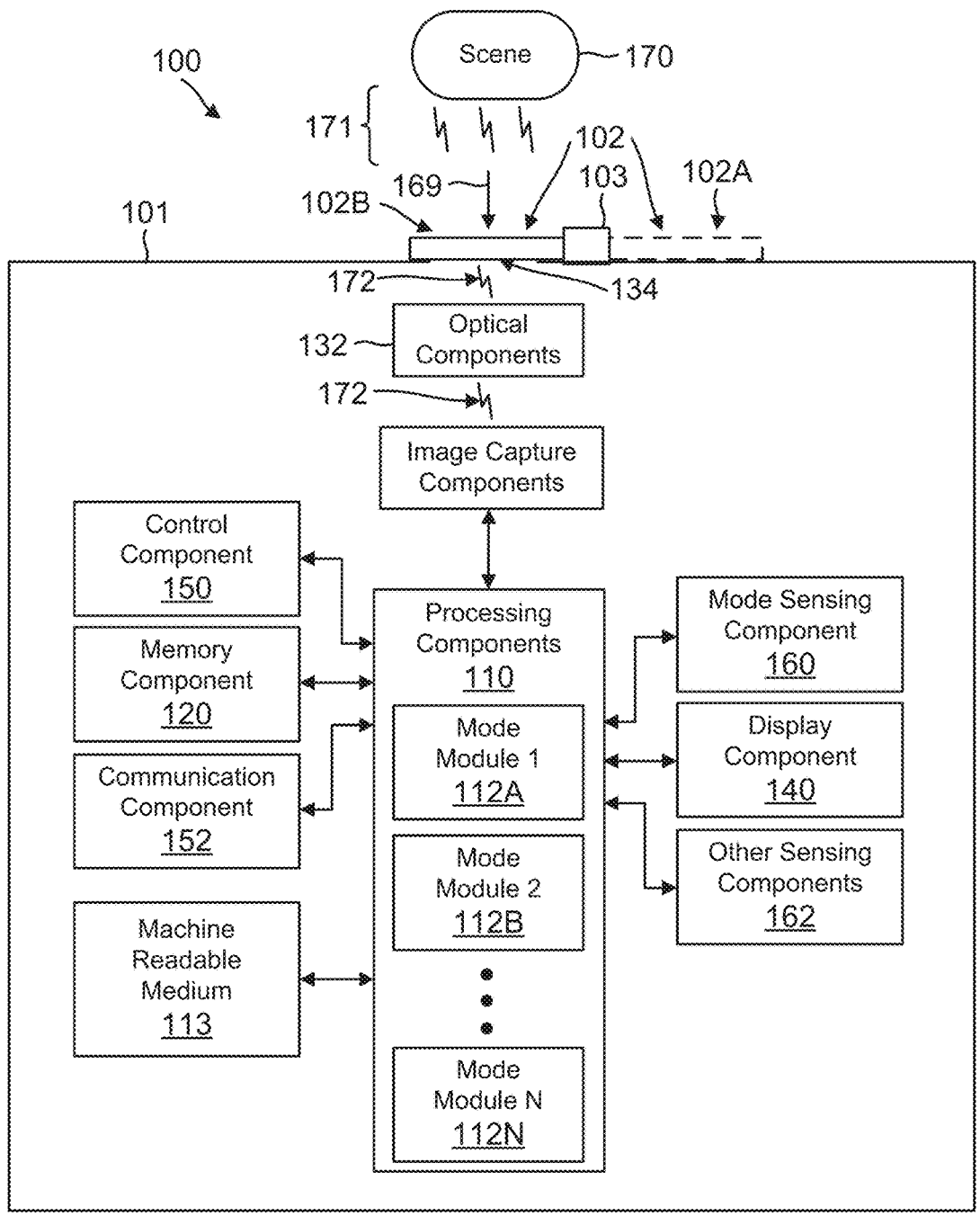
FIG. 1 illustrates a block diagram of an imaging system in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a processing component 110, a memory component 120, an image capture component 130, optical components 132 (e.g., one or more lenses configured to receive electromagnetic radiation through an aperture 134 (e.g., also referred to as an entrance pupil) in housing 101 and pass the electromagnetic radiation to image capture component 130), a display component 140, a control component 150, a communication component 152, a mode sensing component 160, and a sensing component 162.

In various embodiments, imaging system 100 may be implemented as an imaging device, such as a camera, to capture image frames, for example, of a scene 170 (e.g., a field of view). Imaging system 100 may represent any type of camera system which, for example, detects electromagnetic radiation (e.g., irradiance) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Processing component 110 (e.g., also referred to as a processor) may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processing component 110 is adapted to interface and communicate with components 120, 130, 140, 150, 160, and 162 to perform method and processing steps as described herein. Processing component 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in processing component 110 or stored on memory component 120 for access and execution by processing component 110. In another aspect, processing component 110 may be adapted to perform various types of image processing techniques as described herein.

In various embodiments, it should be appreciated that each mode module 112A-112N may be integrated in software and/or hardware as part of processing component 110, or code (e.g., software or configuration data) for each mode of operation associated with each mode module 112A-112N, which may be stored in memory component 120. Embodiments of mode modules 112A-112N (i.e., modes of operation) disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored mode modules 112A-112N provided to imaging system 100 by coupling the machine readable medium 113 to imaging system 100 and/or by imaging system 100 downloading (e.g., via a wired or wireless link) the mode modules 112A-112N from the machine readable medium 113 (e.g., containing the non-transitory information). In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is adapted to execute software stored in memory component 120 and/or machine-readable medium 113 to perform various methods, processes, and modes of operations in manner as described herein.

Image capture component 130 includes, in one embodiment, one or more sensors (e.g., any type of visible light, infrared, or other type of detector, including a detector implemented as part of a visible light sensor array and/or a focal plane array) for capturing image signals representative of an image, of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Processing component 110 may be adapted to receive image signals from image capture component 130, process image signals (e.g., to provide processed image data), store image signals or image data in memory component 120, and/or retrieve stored image signals from memory component 120. Processing component 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Processing component 110 may be adapted to display image data and information on display component 140. Processing component 110 may be adapted to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In one embodiment, processing component 110 may initially process a captured thermal image frame and present a processed image frame in one mode, corresponding to mode modules 112A-112N, and then upon user input to control component 150, processing component 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and processing component 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to processing component 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electro-mechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to processing component 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to processing component 110. Alternatively or in addition, as discussed herein for one or more embodiments, a user may provide a user input via control component 150 (e.g., a wireless touch screen of display component 140) to designate the desired mode (e.g., application) of imaging system 100.

Processing component 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to processing component 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to processing component 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to processing component 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In various embodiments, components of imaging system 100 may be combined and/or implemented or not, as desired or depending on application requirements, with imaging system 100 representing various operational blocks of a system. For example, processing component 110 may be combined with memory component 120, image capture component 130, display component 140, and/or mode sensing component 160. In another example, processing component 110 may be combined with image capture component 130 with only certain operations of processing component 110 performed by circuitry (e.g., a processor, a microprocessor, a microcontroller, a logic device, or other circuitry) within image capture component 130. In still another example, control component 150 may be combined with one or more other components or be remotely connected to at least one other component, such as processing component 110, via a wired or wireless control device so as to provide control signals thereto.

In one embodiment, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Imaging system 100 also includes a semi-transparent shutter 102 that may be selectively inserted into an optical path (e.g., denoted by arrow 169) between scene 170 and image capture component 130. For example, shutter 102 may be translated (e.g., moved or otherwise positioned) between an open position 102A out of the optical path 169 (e.g., outside the optical path 169, also referred to as a first position, and illustrated in broken lines) and a closed position 102B in the optical path 169 (e.g., inside the optical path 169, also referred to as a second position, and illustrated in solid lines). This translation may be performed, for example, by an actuator 103 controlled by processing component 110. For example, in various embodiments, actuator 103 may rotate, slide, and/or otherwise translate shutter 102 between open position 102A and closed position 102B.

While shutter 102 is in the open position 102A, incident radiation 171 passes from scene 170 through aperture 134 and is received by optical components 132 and image capture component 130. However, while shutter 102 is in the closed position 102B, incident radiation 171 must pass through shutter 102 before being received by optical components 132 and image capture component 130.

Shutter 102 may be implemented with any desired level of partial attenuation. For example, in some embodiments, shutter 102 may attenuate incident radiation 171 in thermal wavelengths by approximately 30%, 50%, 70%, or any desired amount greater than 0% and less than 100% (e.g., such that an attenuated, but not completely blocked, thermal image of scene 170 may be captured while shutter 102 is in the closed position 102B). As such, only a portion 172 of the overall incident radiation 171 actually passes through shutter 102.

Although shutter 102 is illustrated as being mounted external to housing 101, other implementations are contemplated. For example, in various embodiments, the shutter 102 may be instead provided in other locations in the optical path 169 between scene 170 and image capture component 130, such as being selectively interposed between: housing 101 and optical components 132; optical components 132 and image capture component 130; or other locations.

As discussed, shutter 102 may be semi-transparent such that it attenuates a portion of the incident radiation 171 received from scene 170, and also passes a remaining portion 172 of the incident radiation 171. In various embodiments, shutter 102 may be implemented with appropriate thicknesses and/or materials to exhibit these semi-transparent properties.

Regarding thickness, in some embodiments, shutter 102 may be implemented with a nominal thickness of approximately 0.008 inches (±0.002 inches). In some embodiments, the nominal thickness may be within a range from approximately 0.012 to approximately 0.005 inches or less.

Regarding materials, in some embodiments, shutter 102 may be implemented using plastic, germanium, sapphire, and/or other materials. In some embodiments, shutter 102 may be implemented using ultra-high molecular weight polyethylene (UHMWPE) and/or very-high molecular weight polyethylene (VHMWPE). As an example for UHMWPE (e.g., molecular weights exceeding two million (atomic mass units, u)), various representative materials include Stamylan® UH034, GUR® 4150, GUR® 4120, and GUR® X143. As an example for VHMWPE (e.g., molecular weights of approximately one-half to one million or more), various representative materials include GUR® GHR 8110 and GUR® Hostalloy 731.

In some embodiments, various types of additives may also be included to the polyethylene material, such as to provide protection (e.g., inhibit weathering) to the polyethylene material and/or to add desired coloration or tinting. For example, IR photons tend to interact with particles that are close to, equal to, or larger than the wavelength of the IR photon. Thus, as an example embodiment, additives may be selected that have particle sizes that are much smaller than the wavelength of the IR photon to minimize interaction and IR absorption.

In some embodiments, materials may be used to provide ultraviolet resistance for the polyethylene material. For example, zinc oxide (e.g., nano-sized form) and/or an additional UV stabilizer may be added. For example, the UV stabilizer may be made, for example, from an oligomeric-hindered amine-light stabilizer (e.g., made by 3V Sigma). The UV stabilizer may function to hinder UV damage to the polyethylene by inhibiting the chemical breakdown initiated by UV light absorption (e.g., inhibit reactive degradation byproducts that cause molecular damage within the polyethylene due to UV exposure), but UV stabilizers also tend to degrade IR transmission. Additional UV stabilizers may include a hindered amine light stabilizer (HALS), which does not necessarily absorb UV but rather inhibits the chemical breakdown process that is initiated when UV is absorbed by a polymer. For example, UV stabilizers Tinuvin® 765, Tinuvin® 770, Tinuvin® 783, and/or Chimassorb® 994 (from Ciba Specialty Chemicals Corp.) may be included with the HDPE material to provide UV protection with minimal IR absorption.

In general, pure polyethylene (PE) may require UV protection, which may be provided in accordance with one or more embodiments by the addition of additives or by the addition of a thin sheet of UV blocking material (e.g., PE incorporating a thin layer of a very high concentration of UV absorber, such as nano-sized ZnO) to cover shutter 102. Alternatively, as an example for an embodiment, a thin sheet of polyethylene (e.g., 0.001 inches) that includes a UV absorber (e.g., zinc oxide) may be laminated to the shutter 102 to provide the desired level of UV protection.

Furthermore, various compositions may be selected in accordance with one or more embodiments, such as for example Stamylan® UH034 and GUR® GHR 8110 along with 0.5 to 1.0% ZnS and optionally a 0.0 to 0.5% UV stabilizer or alternatively ZnO (e.g., 1 to 8% by weight) substituted for ZnS, which may also provide UV protection properties (e.g., to retard weathering of the HDPE material). For example, the ZnO may consist of nano-sized particles (e.g., 60 nanometers in average particle diameter) that are infused into the selected HDPE powder to ensure uniform dispersion and to minimize clumping of the ZnO. The ZnO may provide, for example, up to 100% attenuation of the UV over a penetration distance of 0.010 inches with minimal IR transmission loss at ZnO levels of 2% by weight.

In some embodiments, shutter 102 may be implemented with a material having a square wave response greater than 75% at 4.75 pixels per cycle for the long wave IR (LWIR) spectrum (e.g., nominally 8-12 micrometers).

In some embodiments, shutter 102 may be provided in accordance with any of the various thicknesses and/or materials discussed in relation to IR-transmissive domes and related features in U.S. Pat. No. 8,905,311 issued Dec. 9, 2014 and U.S. Pat. No. 9,001,212 issued Apr. 7, 2015, all of which are incorporated herein by reference in their entirety.

Figure 2:
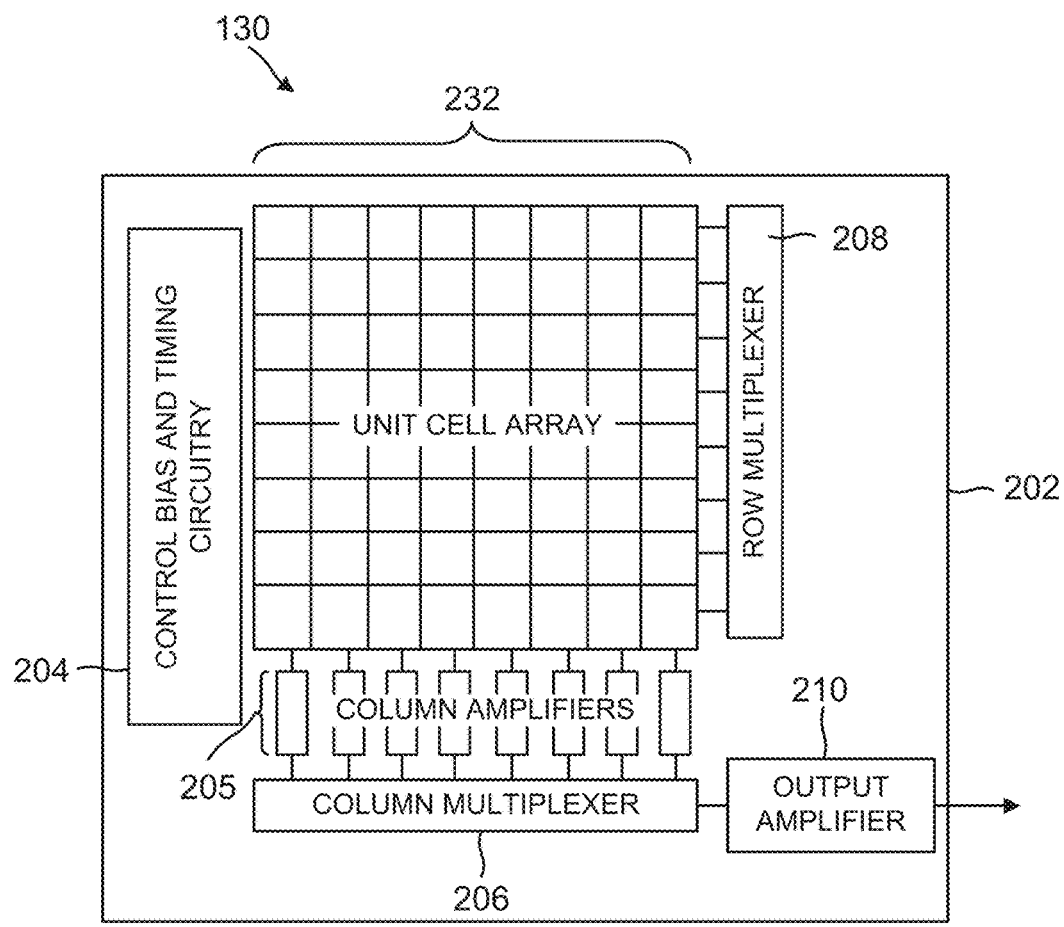
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a focal plane array (FPA) including an array of unit cells 232 and a read out integrated circuit (ROTC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to processing component 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

The operation of shutter 102 and the advantages of its semi-transparent implementation can be further understood with regard to the example plots shown in FIGS. 3A-D. In each of FIGS. 3A-D, one line (e.g., one row or column including 50 pixels) of a thermal image captured by corresponding unit cells 232 of image capture component 130 is represented by the X-axis. A number of counts (e.g., sample value) of each pixel is represented by the Y-axis.

Figure 3A:
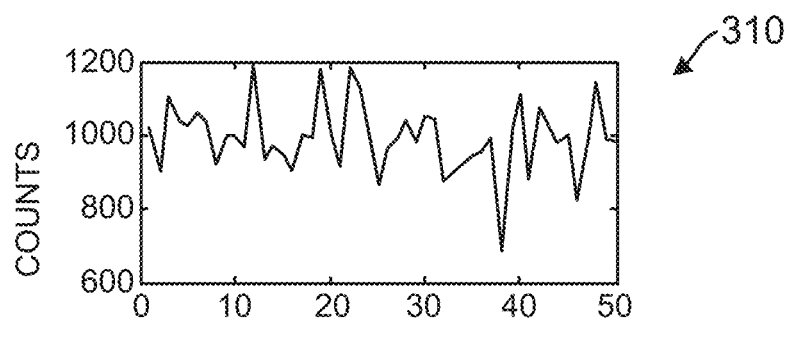
FIGS. 3A-D illustrate example plots of pixel values in accordance with embodiments of the disclosure.

FIG. 3A illustrates a plot 310 of the thermal image line while shutter 102 is in the open position 102A. In this example, the sampled values are a composite representation of the FPN associated with system 100 and the incident radiation 171 received from scene 170 without any attenuation by shutter 102. In this example, the FPN contribution (e.g., having a high to low count range of approximately 500 counts) is significantly greater than the incident radiation 171 contribution (e.g., having a high to low count range of approximately 40 counts). As such, the incident radiation 171 contribution imparts only small changes on the overall counts associated with the FPN.

Figure 3B:
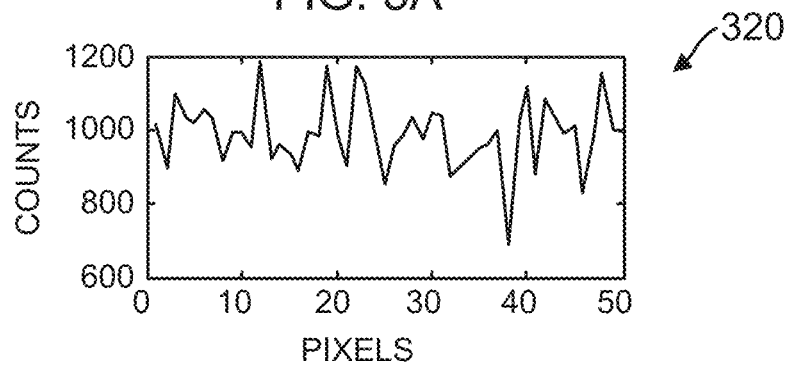

FIG. 3B illustrates a plot 320 of the thermal image line while shutter 102 is in the closed position 102B. In this case, the sampled values are a composite representation of the FPN associated with system 100 and the remaining incident radiation 172 passed by shutter 102. In this example, a 50% attenuation is used. Because the FPN contribution is still significantly greater than even the remaining incident radiation 172 contribution in this example as discussed above, plots 310 and 320 appear very similar (e.g., the small remaining incident radiation 172 contribution imparted on the FPN counts in plot 320 is 50% of the incident radiation 171 imparted on the FPN counts in plot 310).

Figure 3C:
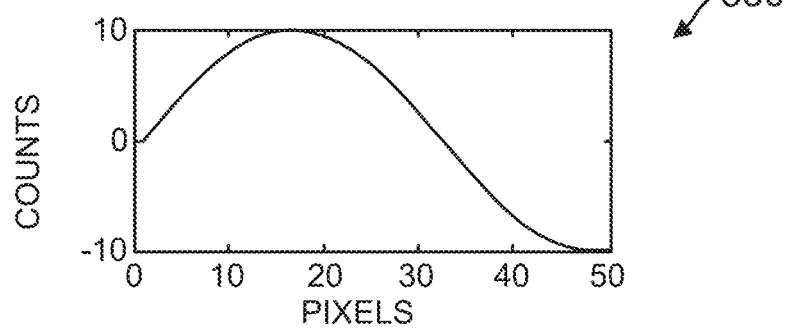

FIG. 3C illustrates a plot 330 of a difference taken between plots 310 and 320. Because the FPN is present in both of plots 310 and 320, and the incident radiation 171 of plot 310 is attenuated to the remaining incident radiation 172 of plot 320, the resulting plot 330 represents the difference between incident radiation 171 and remaining incident radiation 172 with the FPN removed. As discussed, shutter 102 in this example attenuates by 50%. As a result, plot 330 represents 50% of the incident radiation 171.

Figure 3D:
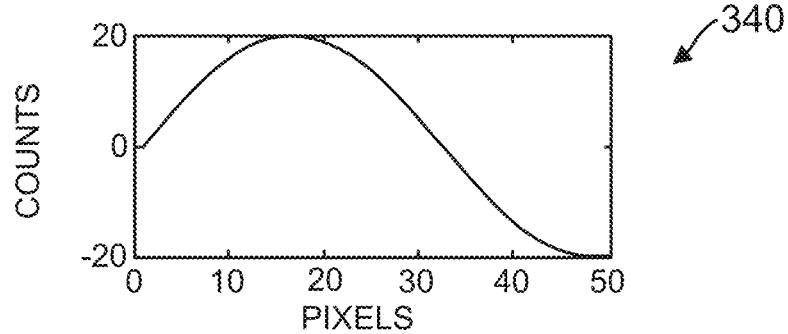

FIG. 3D illustrates a plot 340 corresponding to plot 330 after a gain factor has been applied to compensate for the attenuation performed by shutter 102. Because a 50% attenuation is used in this example, a gain factor of 2 is applied to plot 330 to compensate. Thus, plot 340 illustrates the actual incident radiation 171 with FPN removed.

In view of the above examples and processes, it will be understood that FPN associated with system 100 can be determined by processing images captured while shutter 102 is in the open and closed positions 102A/102B. In particular, FPN can be determined and subsequently removed from newly captured open shutter images.

For example, as discussed, the values of plot 310 include contributions from the FPN associated with system 100 and the incident radiation 171 received from scene 170 without any attenuation by shutter 102. As also discussed, the values of plot 340 include incident radiation 171 with FPN removed. Thus, by taking the difference between plot 310 (including incident radiation 171 and FPN) and plot 340 (including gain corrected incident radiation 171 from scene 170), the FPN itself can be isolated. After the FPN is isolated, FPN correction terms may be generated to remove the FPN from thermal images.

Figure 4A:
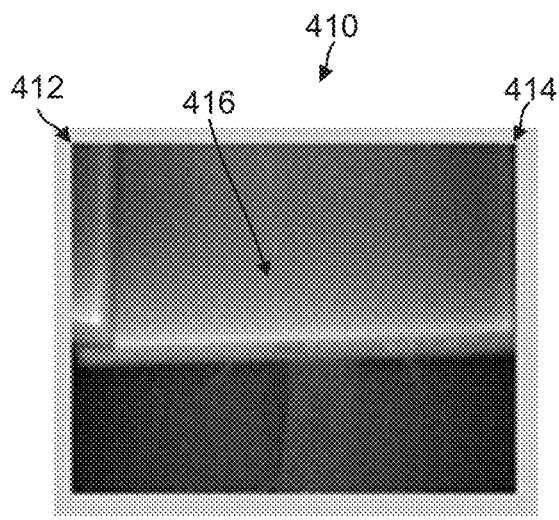
FIGS. 4A-C illustrate example thermal images in accordance with embodiments of the present disclosure.
Figure 4B:
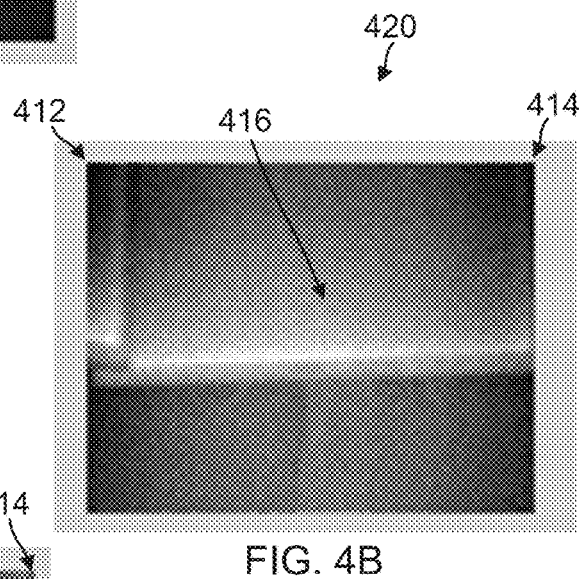
Figure 4C:
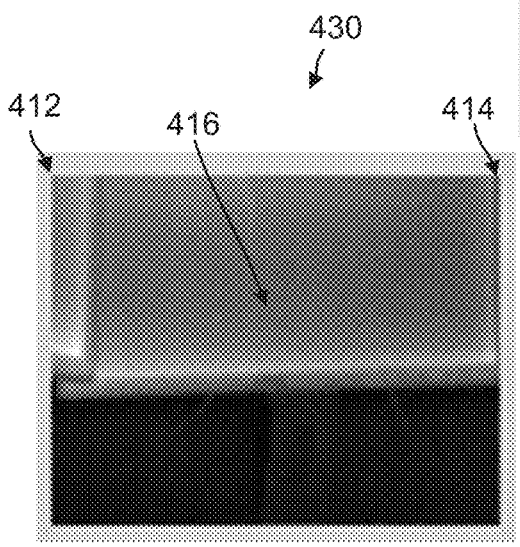

The above applications may be further understood with reference to FIGS. 4A-C. FIGS. 4A-C illustrate example thermal images in accordance with embodiments of the present disclosure.

FIG. 4A illustrates a thermal image 410 captured while shutter 102 is in the open position 102A. Similar to plot 310 of FIG. 3A, each pixel of thermal image 410 is a composite representation of the FPN associated with system 100 and the incident radiation 171 received from scene 170 without any attenuation by shutter 102. In particular, thermal image 410 includes FPN which is evidenced by darkening in corner regions 412/414 and lightening in center region 416.

FIG. 4B illustrates a thermal image 420 captured while shutter 102 is in the closed position 102B. Similar to plot 320 of FIG. 3B, each pixel of thermal image 420 is a composite representation of the FPN associated with system 100 and the remaining incident radiation 172 passed by shutter 102. In this example, a 70% attenuation is used. Accordingly, the remaining incident radiation 172 represents 30% of the incident radiation 171. Because of this attenuation, the FPN darkening in corner regions 412/414 and the lightening in center region 416 are more apparent in FIG. 4B because the signal to noise ratio has decreased (e.g., the ratio of detected scene radiation to FPN has decreased).

FIG. 4C illustrates a thermal image 430 obtained by subtracting thermal image 420 from thermal image 410. Similar to plot 330 of FIG. 3C, each pixel of thermal image 430 represents the difference between incident radiation 171 and remaining incident radiation 172 with the FPN removed. In this regard, corner regions 412/414 are lighter and center region 416 is darker in thermal image 430 (due to the removal of FPN) when compared with thermal images 410 and 420 (which still include FPN).

As discussed, shutter 102 in this example attenuates by 70%. Accordingly, thermal image 430 represents 70% of the incident radiation 171 (e.g., the difference between unattenuated incident radiation 171 and remaining incident radiation 172 is 70% of the incident radiation 171). Thermal image 430 may be further processed by an appropriate gain factor (e.g., approximately 1.43) to compensate for the attenuation of the incident radiation 171 and thus provide a thermal image of scene 170 with FPN removed.

Figure 5:
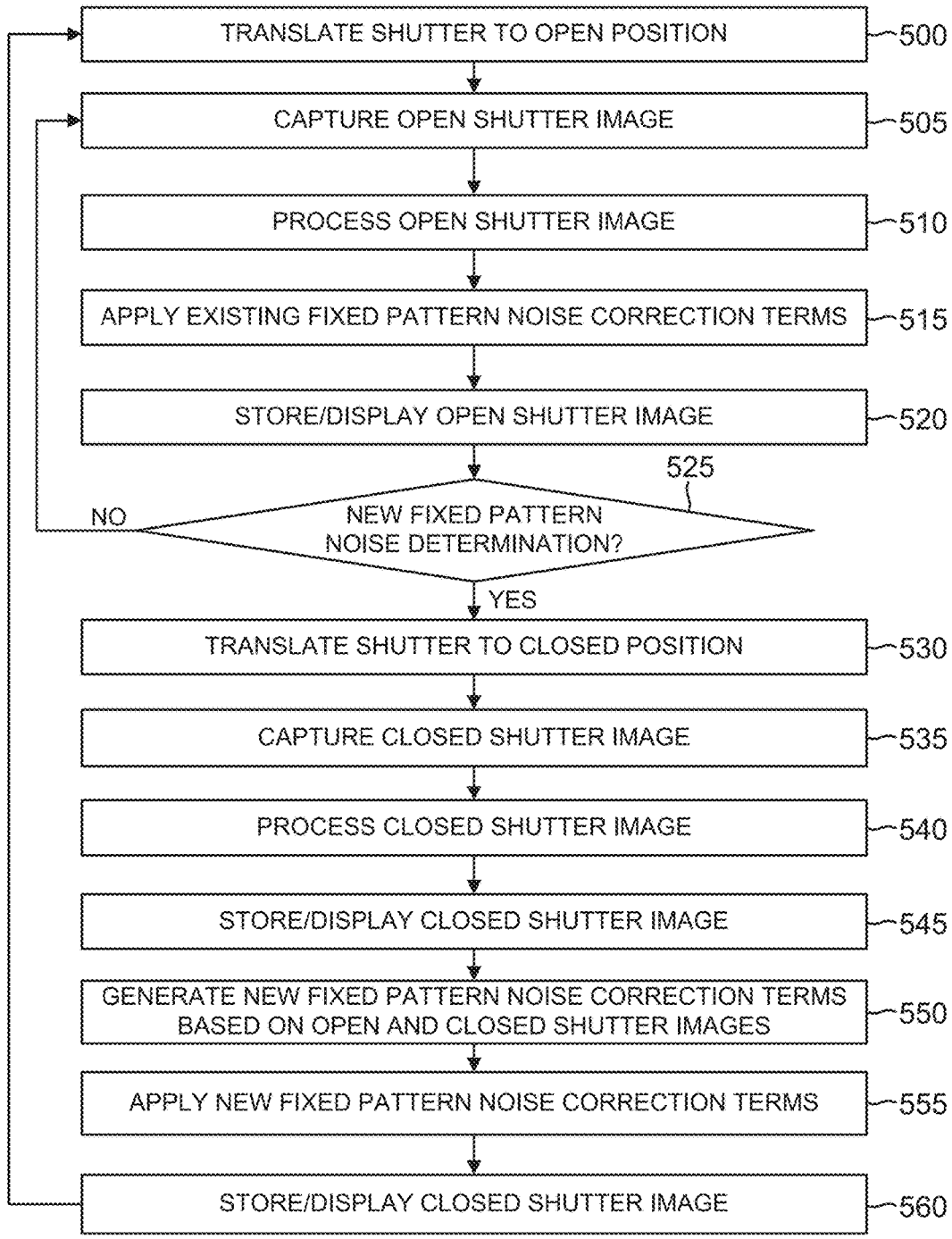
FIG. 5 illustrates a process of removing fixed pattern noise (FPN) using a semi-transparent shutter in accordance with an embodiment of the disclosure.

FIG. 5 illustrates a process of removing FPN in accordance with an embodiment of the disclosure. In various embodiments, the process of FIG. 5 may be performed by processing component 110 used to control various components of system 100 and further used to process captured images.

As shown, FIG. 5 includes a main loop of blocks 500-525 that may be performed during normal operation of system 100. FIG. 5 also includes a calibration loop of blocks 530-560 that may be performed periodically and/or on demand to determine new or updated FPN correction terms.

In block 500, actuator 103 translates shutter 102 to open position 102A. In block 505, image capture component 130 captures one or more images while shutter 102 is maintained in open position 102A. As similarly discussed with regard to FIGS. 3A and 4A, thermal images captured in block 505 include pixel values determined by incident radiation 171 received from scene 170 without any attenuation by shutter 102, and further determined by FPN associated with system 100.

In block 510, processing component 110 perform. In various processing on the open shutter image including, for example, non-uniformity correction, gain correction, temporal noise filtering, low pass filtering (e.g., to remove high spatial frequency noise), and/or other processing as appropriate.

In block 515, processing component 110 applies previously determined FPN correction terms, if any (e.g., generated by a previous iteration of block 550).

In block 520, processing component 110 stores the open shutter image, for example, in memory component 120. In some embodiments, block 520 may further include processing component 110 displaying the open shutter image on display component 140, for example, for realtime viewing of scene 170 by a user.

In block 525, processing component 110 decides whether updated FPN correction terms should be determined. For example, in some embodiments, FPN correction terms may be calculated periodically and/or in response to conditions detected by components of system 100, the results of processing performed in block 510, and/or other criteria. If new or updated FPN correction terms are not to be calculated, then the process returns to block 505 where another open shutter image is captured. Otherwise, the process continues to block 530.

In block 530, actuator 103 translates shutter 102 to closed position 102B. In block 535, image capture component 130 captures one or more images while shutter 102 is maintained in closed position 102B. As similarly discussed with regard to FIGS. 3B and 4B, images captured in block 535 include pixel values determined by the remaining incident radiation 172 passed by shutter 102, and further determined by the FPN associated with system 100.

In block 540, processing component 110 processes the closed shutter image as similarly discussed with regard to block 510. In particular, block 540 may include applying an appropriate gain factor to the closed shutter image to compensate for attenuation of incident radiation 171 by shutter 102.

Also in block 540, additional filtering may be applied to the closed shutter image to compensate for an increased signal to noise ratio. In this regard, because the incident radiation 171 is attenuated down to the remaining incident radiation 172 by shutter 102 during the closed shutter image capture of block 535, a larger proportion of the pixel values of the closed shutter image may be associated with FPN rather than desired scene information (e.g., the signal to noise ratio may change as similarly discussed with regard to FIG. 4B).

In block 545, processing component 110 stores the closed shutter image, for example, in memory component 120. In some embodiments, block 545 may further include processing component 110 displaying the closed shutter image on display component 140 before any new FPN correction terms have been determined, for example, for realtime viewing of scene 170 by a user even while shutter 102 is in closed position 102B.

In block 550, processing component 110 determines (e.g., isolates) the FPN currently associated with the open and closed shutter images and generates corresponding FPN correction terms (e.g., new or updated). As similarly discussed with regard to plots 310 and 340, processing component 110 may determine the FPN by taking a difference between the open shutter image (e.g., including incident radiation 171 and FPN) and the closed shutter image (e.g., after a gain factor has been applied to compensate for attenuation by shutter 102, thus including gain corrected incident radiation 171 from scene 170). In some embodiments where previous FPN correction terms have already been applied (e.g., in the processing performed by blocks 515 and 540), the FPN determined in block 550 may represent changes in the FPN over a previous FPN determination. As such, the FPN correction terms generated in block 550 may be used to adjust (e.g., operating as delta values) previously generated FPN correction terms.

In block 555, processing component 110 further processes the closed shutter image by applying the newly generated FPN correction terms to the closed shutter image.

In block 560, processing component 110 again stores the closed shutter image, for example, in memory component 120. In some embodiments, block 560 may further include processing component 110 displaying the closed shutter image on display component 140 for realtime viewing of scene 170 by a user with FPN removed.

Following block 560, the process returns to block 500 where actuator 103 translates shutter 102 to open position 102A in preparation for capturing new open shutter images. By repeatedly performing blocks 540 through 560 (e.g., at periodic or various time intervals), system 100 may continue to update the FPN correction terms over time.

Other embodiments are also contemplated. For example, although various display operations have been discussed in relation to blocks 520, 545, and 560, these may be selectively rearranged, changed, and/or omitted as may be desired for particular applications, depending on the particular images desired to be viewed (e.g., open shutter images and closed shutter images with or without FPN correction terms applied).

For example, in some embodiments, FPN can be removed from images stored and/or displayed while shutter 102 is closed without requiring calculation or application of FPN terms. For example, as similarly discussed with regard to FIG. 4C, by subtracting a closed shutter image from an open shutter image, FPN can be removed. The resulting difference image may be gain-corrected and stored and/or displayed as desired.

Additional embodiments are contemplated that use shutters that only partially obstruct an optical path of an imaging device. For example, in such embodiments, an imaging device may be implemented with a shutter that covers only a portion of an optical component (e.g., a lens) of the imaging device. In this regard, the shutter may attenuate a portion of the incident radiation (e.g., visible light radiation or infrared radiation) received from a scene, thus blocking that portion of the radiation from passing through the optical component. Meanwhile, a remaining portion of the incident radiation may simultaneously pass unobstructed to the optical component (i.e., the remaining portion of the radiation may bypass the shutter). Thus, in contrast to the semi-transparent embodiments previously discussed which would typically receive all scene radiation through a semi-transparent shutter, the partial shutter embodiments further discussed herein receive only a portion of the incident radiation at the partial shutter and pass the remaining scene radiation separately from the shutter without attenuation.

The partially blocking shutter may be selectively translated between open and closed positions to perform a calibration process for determining FPN correction terms. In the open position, an image capture component (e.g., a visible light sensor array and/or an FPA) captures images of the scene without any interference by the shutter (e.g., radiation freely passes through an optical component to an image capture component). In the closed position, the shutter is interposed (e.g., positioned) between the scene and a portion of the optical component such that the optical component receives attenuated radiation. In particular, radiation from the entire imaged scene may be passed through the optical component such that an entire image of the scene may be captured by the image capture component, however the overall amount of radiation received by the image capture component will be reduced due to the partial obstruction of the optical component by the interposed shutter. By comparing the images captured in both shutter positions, FPN associated with the imaging device may be determined, and corresponding FPN correction terms may be calculated.

Again, although these various techniques will be discussed primarily in relation to thermal images and thermal imaging devices, the same or similar techniques may be used in relation to any desired radiation wavelengths (e.g., visible light images and visible light imaging devices).

Figure 6A:
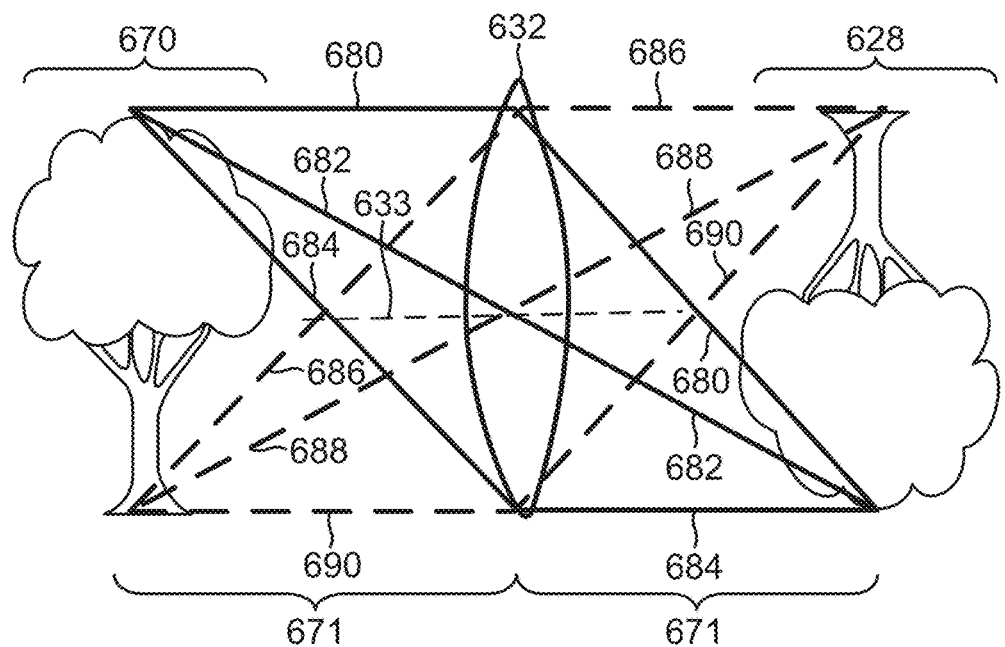
FIG. 6A illustrates an example optical component with an unobstructed view of an imaged scene in accordance with an embodiment of the disclosure.
Figure 6B:
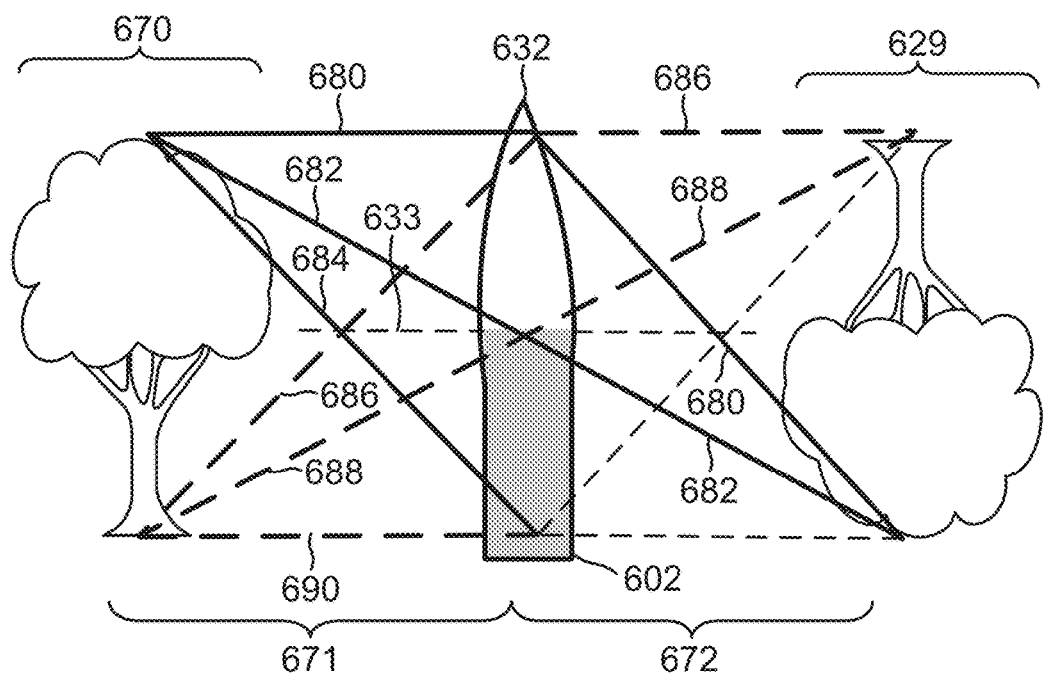
FIG. 6B illustrates an example optical component partially obstructed by a shutter in accordance with an embodiment of the disclosure.

These operational principles may be further understood with reference to FIGS. 6A and 6B. FIG. 6A illustrates an optical component 632 having an optical axis 633 with an unobstructed view of a scene 670 in accordance with an embodiment of the disclosure. Incident radiation 671 (e.g., represented by ray traces 680, 682, 684, 686, 688, and 690) from scene 670 (e.g., a tree) passes through optical component 632 and is received by an image capture component which provides a captured image 628 of scene 670.

FIG. 6B illustrates optical component 632 partially obstructed by a shutter 602 in accordance with an embodiment of the disclosure. In this case, only a portion 672 (e.g., represented by ray traces 680, 686, and 688, and portions of ray traces 682 and 688) of the total incident radiation 671 passes through optical component 632 and is received by an image capture component which provides a captured image 629 of scene 670. However, another portion of incident radiation 671 (e.g., represented by ray traces 684 and 690, and portions of ray traces 682 and 688) is blocked (e.g., partially or completely) by shutter 602.

By comparing FIGS. 6A and 6B, it will be understood that incident radiation from the entire scene 670 is represented in both of images 628 and 629 (e.g., radiation from the top and bottom of scene 670 is received by the image capture component in both cases). As a result, both of images 628 and 629 will represent the entirety of the imaged scene 670 as shown in FIGS. 6A and 6B.

Moreover, because optical component 632 and its associated image capture component are focused on a far scene 670 while shutter 602 is positioned close to optical component 632, shutter 602 will be completely defocused in relation to the image capture component. As a result, shutter 602 will be effectively invisible to a user viewing image 629, as the entire scene 670 continues to be imaged even while shutter 602 partially obstructs optical component 632.

By comparing FIGS. 6A and 6B, it will be understood that the overall incident radiation received for image 628 is greater than for image 629. As a result, image 629 will generally appear fainter than image 628 (e.g., the overall number of counts per pixel may be less). However, by compensating for this attenuation (e.g., by increasing the number of counts per pixel of image 629 proportionally to compensate for the blocked portion of incident radiation 671 corresponding to ray traces 684 and 690, and portions of ray traces 682 and 688), image 629 may be modified (e.g., brightened) to appear substantially identical to image 628 when presented to a user (e.g., nearly no significant visible image degradation will be observed).

Thus, shutter 602 may be selectively interposed between scene 670 and a portion of optical component 632 to capture unshuttered image 628 and partially shuttered image 629 without user-visible image degradation. As further discussed herein, the capturing of such unshuttered and partially shuttered images may be used to determine FPN (e.g., also referred to as DC offset) associated with each individual pixel of captured images (e.g., each pixel corresponding to a particular sensor of an array).

In the case of a visible light image captured when shutter 602 is not interposed between scene 670 and optical component 632 (e.g., FIG. 6A), each pixel of image 628 may have an associated value A1 as set forth in equation 1:

$$A1 = X1 + Y1 \quad \text{(equation 1)}$$

Here, X1 is the incident radiation (e.g., ray traces 680, 682, 684, 686, 688, and 690) received by a visible light sensor of the image capture component associated with the pixel, and Y1 is the FPN associated with the pixel.

In the case of a visible light image captured when shutter 602 is interposed between scene 670 and optical component 632 (e.g., FIG. 6B), each pixel of image 629 may have an associated value A2 as set forth in equation 2:

$$A2 = 0.5*X1 + Y1 \quad \text{(equation 2)}$$

In this particular embodiment, shutter 602 is positioned to block 50% of the incident radiation from passing through optical component 632 and therefore 50% of the incident radiation X1 (i.e., 0.5*X1 corresponding to ray traces 680 and 686, and portions of ray traces 682 and 688) contributes toward the pixel value along with the FPN Y1. Other shutter blockage amounts (e.g., greater or less than 50%) may be used in other embodiments.

Using equations 1 and 2, the FPN Y1 for a visible light image pixel may be determined based on the unshuttered and shuttered pixel values as set forth in equation 3:

$$Y1 = 2*A2 - A1 \quad \text{(equation 3)}$$

In equation 3, a gain factor of 2 is applied to pixel value A2 to compensate for the 50% attenuation by shutter 602. Other gain factors may be applied for other amounts of attenuation.

In view of the above discussion, it will be appreciated that the FPN Y1 for each pixel of a visible light image capture component may be determined based on the known pixel values A1 and A2 of unshuttered and partially shuttered images 628 and 629, respectively.

In the case of an infrared image captured when shutter 602 is not interposed between scene 670 and optical component 632 (e.g., FIG. 6A), each pixel of image 629 may have an associated value A1 as set forth in equation 4:

$$A1 = X1 + Y1 \quad \text{(equation 4)}$$

Here, X1 is the incident radiation (e.g., ray traces 680, 682, 684, 686, 688, and 690) received by an infrared sensor (e.g., unit cell) of the image capture component associated with the pixel, and Y1 is the FPN associated with the pixel.

In the case of an infrared image captured when shutter 602 is interposed between scene 670 and optical component 632 (e.g., FIG. 6B), each pixel of image 629 may have an associated value A2 as set forth in equation 5:

$$A2 = 0.5*X1 + \text{ShutterDC} + Y1 \quad \text{(equation 5)}$$

Here, similar to the previously described embodiment for the visible light images, shutter 602 is positioned to block 50% of the incident radiation from passing through optical component 632 and therefore 50% of the incident radiation X1 (i.e., 0.5*X1 corresponding to ray traces 680 and 686, and portions of ray traces 682 and 688) contributes toward pixel value A2 along with the FPN Y1. Other shutter blockage amounts (e.g., greater or less than 50%) may be used in other embodiments.

Shutter 602 itself may emit infrared radiation that is received by the image capture component while shutter 602 partially blocks optical component 632 (e.g., infrared radiation from shutter 602 may pass through optical component 632 to the image capture component). Thus, as further shown in equation 5, pixel value A2 may include a contribution from shutter 602 denoted as ShutterDC. In this regard, the shutter-emitted radiation may induce a flat FPN DC offset to the pixel value.

Using equations 4 and 5, the FPN Y1 for the infrared image pixel may be determined based on the unshuttered and shuttered pixel values as set forth in equation 6:

$$Y1 = 2*A2 - A1 - 2*ShutterDC \qquad \text{(equation 6)}$$

In view of the above discussion, it will be appreciated that the FPN Y1 for each pixel of an infrared image capture component may be determined based on the known pixel values A1 and A2 of unshuttered and partially shuttered images 628 and 629, respectively, as well as the known ShutterDC value (e.g., offset).

The ShutterDC value may be determined in accordance with various techniques. For example, in some embodiments, the ShutterDC value may be constant for all pixels of image 629 captured when shutter 602 is interposed between scene 670 and optical component 632 (e.g., the ShutterDC contribution does not vary from pixel to pixel). As previously identified in equation 6, the FPN Y1 for infrared images is determined by the values of A1, A2, and ShutterDC. A partial correction using known values (e.g., a correction corresponding to 2*A2−A1 which is only a portion of Y1) may be applied to the pixels of images 628 and 629 to provide partially corrected versions of images 628 and 629. In the case where FPN Y1 exhibits a zero mean across all pixels, the ShutterDC value may be determined to be the difference between the average pixel value of the partially corrected unshuttered image 628 and the average pixel value of the partially corrected shuttered image 629. In some embodiments (e.g., where FPN Y1 does not exhibit a zero mean across all pixels), localized subsets of pixels may be used to determine the average pixel values (e.g., to determine corresponding localized ShutterDC values). In either case, the ShutterDC value (e.g., global or localized) for each pixel may be determined.

As a result, the full value of FPN Y1 as set forth in equation 6 may be known and further used to determine appropriate FPN correction terms. Thus, in the above example, the ShutterDC value may be determined even if the temperature of shutter 602 is not known or measured.

In various embodiments, shutter 602 may be used to perform radiometric corrections, even when implemented as a partial shutter (e.g., user-viewable images may still be provided even during radiometric correction processes performed by a processing component of an imaging system because shutter 602 does not fully block scene 670). This may be demonstrated by the following example in which the radiometrically determined temperature of scene 670 is 30 degrees C., the measured temperature of shutter 602 is 20 degrees C., shutter 602 is opaque and blocks 50% of the incident radiation 671, and the image capture device has a responsivity of 1 count per degree C. In this example, shutter 602 may be provided with a temperature sensor (e.g., a thermistor or other appropriate component provided by sensing components 162 of FIG. 1) to measure its temperature.

In this case, assuming that FPN Y1 exhibits a zero mean across all pixels, the pixel values of image 629 may be expected to exhibit 5 less counts than corresponding pixel values of image 628 (e.g., 50% of the image capture component will receive an unblocked portion of incident radiation 671 corresponding to the 30 degree C. temperature of scene 670, and the remaining 50% of the image capture component will receive radiation from shutter 602 corresponding to the 20 degree C. temperature of shutter 602).

If the actual measured difference in pixel values between images 628 and 629 is different than the expected 5 count difference, then it may be concluded that the prior radiometrically determined temperature of scene 670 is erroneous. As a result, the radiometric temperature associated with scene 670 may be corrected based on the actual measured difference of pixel values (e.g., if the actual measured difference in pixel values between images 628 and 629 is zero, then it may be determined that scene 670 exhibits the same 20 degree C. temperature as shutter 602 in this example).

Figure 7:
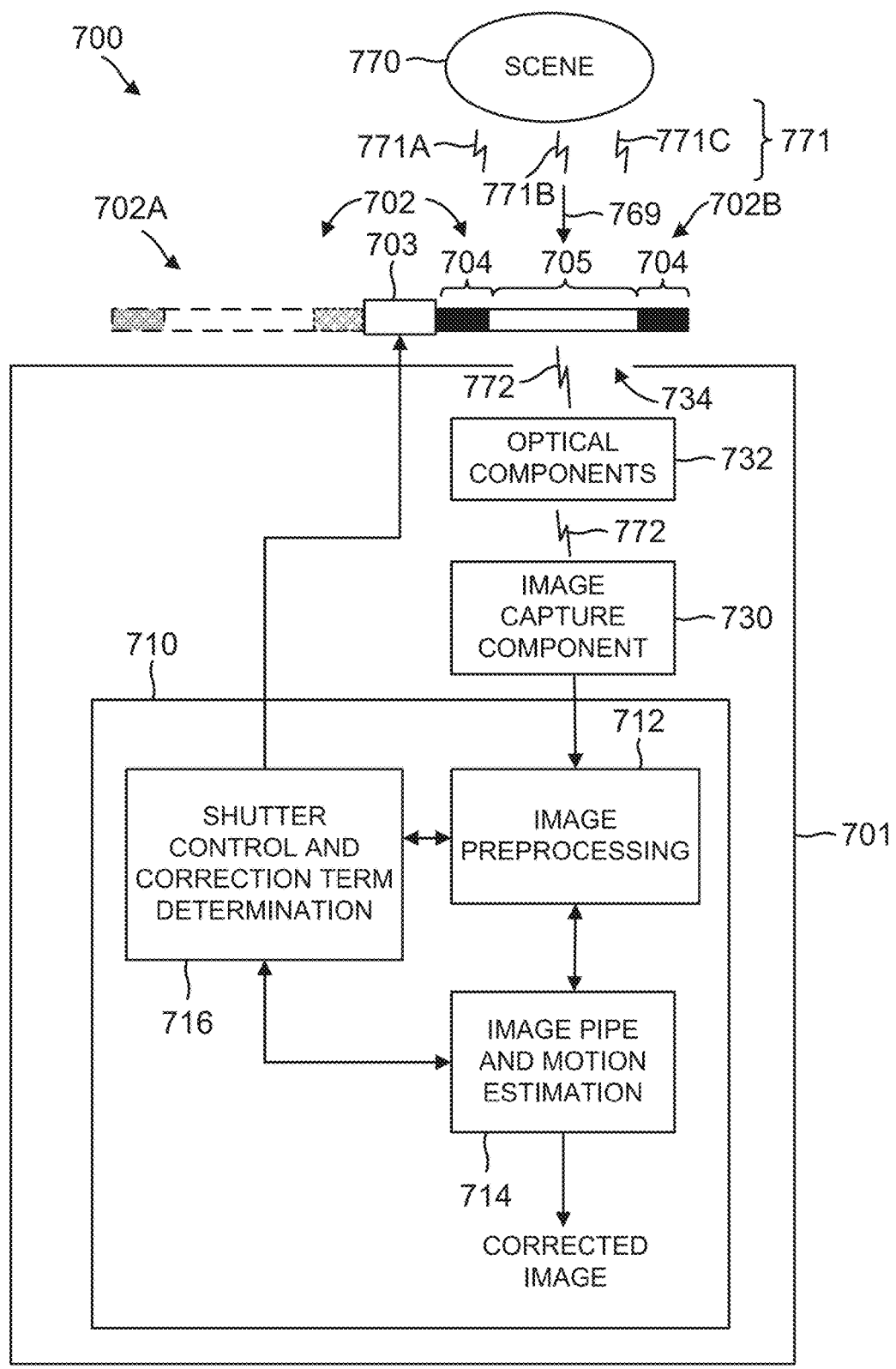
FIG. 7 illustrates another block diagram of an imaging system in accordance with an embodiment of the disclosure.

FIG. 7 illustrates a block diagram of an imaging system 700 using a partial shutter approach in the manner discussed above in accordance with an embodiment of the disclosure. In various embodiments, imaging system 700 may be implemented with one or more components in a similar manner as imaging system 100. For example, imaging system 700 includes a housing 701 (e.g., including an aperture 734), a shutter 702, an actuator 703, a processing component 710, an image capture component 730, and optical components 732, any of which may be implemented in the same or similar manner as corresponding components of imaging system 100 previously discussed. In some embodiments, imaging system 700 may also include other components of FIG. 1 as desired to interoperate appropriately with the illustrated components of FIG. 7.

Shutter 702 may be selectively inserted into an optical path (e.g., denoted by arrow 769) between scene 770 and optical components 732. Although shutter 702 is illustrated as being mounted external to housing 701 and at aperture 734, other implementations are contemplated. For example, in various embodiments, the shutter 702 may be instead mounted internal to housing 701 and selectively inserted between aperture 734 and optical components 732.

Shutter 702 may be translated (e.g., moved or otherwise positioned) between an open position 702A out of the optical path 769 (e.g., outside the optical path 769, also referred to as a first position, and illustrated in broken lines) and a closed position 702B in the optical path 769 (e.g., inside the optical path 769, also referred to as a second position, and illustrated in solid lines). This translation may be performed, for example, by actuator 703 controlled by processing component 710. For example, in various embodiments, actuator 703 may rotate, slide, and/or otherwise translate shutter 702 between open position 702A and closed position 702B.

While shutter 702 is in the open position 702A, incident radiation 771 (e.g., including incident radiation 771A-C) passes from scene 770 through aperture 734 and is received by optical components 732 and image capture component 730. However, while shutter 702 is in the closed position 702B, at least a portion of incident radiation 771 is attenuated such that only a portion 772 of the overall incident radiation 771 actually passes to optical components 732 and on to image capture component 730 as illustrated.

In this regard, shutter 702 may be implemented as a partial shutter configured to block only a portion of optical components 732. For example, as shown in FIG. 7, shutter 702 may include one or more blocking portions 704 that at least partially attenuate incident radiation 771 received from a scene 770. In some embodiments, blocking portions 704 may be implemented as opaque as shown in FIG. 7 where incident radiation 771A and 771C received at the blocking portions 704 is fully attenuated (e.g., the incident radiation 772 passed to optical components 732 does not include contributions from incident radiation 771A and 771C). In other embodiments, blocking portions 704 may be semi-transparent in a similar manner as shutter 102 previously discussed herein where incident radiation 771A and 771C received at blocking portions 704 is only partially attenuated (e.g., the incident radiation 772 passed to optical components 732 may include at least some contributions from incident radiation 771A and 771C).

Shutter 702 also includes one or more non-blocking portions 705 that permit incident radiation 771B received at the non-blocking portions 705 to pass unobstructed to optical components 732 (e.g., the incident radiation 772 passed to optical components 732 includes incident radiation 771B). For example, in some embodiments, non-blocking portions 705 may be completely open apertures with no material interposed between scene 770 and optical components 732. In other embodiments, non-blocking portions 705 may be implemented with materials that are fully transparent to incident radiation 771B in the wavelength ranges to be captured by image capture component 730.

Although shutter 702 is illustrated as having two blocking portions 704 and one non-blocking portion 705 disposed therebetween, other configurations are also contemplated. For example, in some embodiments, shutter 702 may be implemented with only a single blocking portion 704 (e.g., only the leftmost blocking portion 704) illustrated in FIG. 7. In such embodiments, only the single blocking portion 704 would be interposed between scene 770 and optical components 732 to attenuate incident radiation 771A, while the remaining incident radiation 771B and 771C would freely pass by shutter 702 to be received by optical components 732. Thus, any desired configuration of shutter 702 may be used to at least partially block incident radiation 771 received from scene 770 while in the closed position 702B.

Blocking portions 704 may be sized and/or implemented using appropriate materials to block any desired portion of incident radiation 771. For example, in some embodiments, blocking portions 704 may attenuate approximately 20% to 80% of incident radiation 771 when shutter 702 is in the closed position 702B. In some embodiments, even lesser attenuation (e.g., down to approximately 5%) or greater attenuation(e.g., up to approximately 95%) of incident radiation 771 may be used.

Significantly, in all of these partial shuttering implementations, shutter 702 may still permit the entirety of scene 770 to be captured by image capture component 730 as previously discussed with regard to FIG. 6B (e.g., portions of incident radiation 771 from the entire imaged scene 770 may still be passed through optical components 732).

Processing component 710 may be implemented in a similar manner as processing component 110 previously discussed herein. Accordingly, processing component 710 may be configured to execute instructions to implement various processing modules illustrated in FIG. 7. In the embodiment of FIG. 7, processing component 710 may include an image preprocessing module 712, an image pipe and motion estimation module 714, shutter control and correction term determination module 716, and/or other modules as appropriate.

Modules 712, 714, and 716 interoperate with each other to determine and apply FPN correction terms to captured images, and also to compensate for reductions in pixel counts for images captured when shutter 702 is in the closed position 702B.

Module 712 receives images from image capture component 730 and performs initial processing on the images as appropriate. The images are provided to module 714 for use in estimating motion and applying FPN correction terms, and are also provided to module 716 for use in determining FPN correction terms.

Module 714 receives the captured images from module 712 and performs a motion analysis to determine whether individual pixels of the captured images exhibit motion. In this regard, each captured image may include pixels arranged in rows and columns, with each pixel corresponding to a particular location in successive captured images and each pixel also having an associated pixel value for each captured image. For each pixel, module 714 may compare one or more associated pixel values in unshuttered images captured before and after one or more shuttered images (e.g., before and after shutter 702 has completed a full cycle of being translated from open position 702A to closed position 702B and back to open position 702A).

If a particular pixel exhibits substantially the same pixel value for the unshuttered images taken before and after the shutter cycle, then module 714 may determine that the particular pixel is not associated with motion (e.g., the feature of the scene corresponding to the pixel has remained fixed in place relative to system 700 and therefore the pixel exhibits substantially the same pixel values in the compared images). Conversely, if the pixel values differ significantly, then it may be determined that the particular pixel is associated with motion (e.g., the feature of the scene corresponding to the pixel has moved relative to system 700 and therefore the pixel exhibits different pixel values in the compared images). Module 714 may perform this motion analysis on a pixel-wise basis to provide a current motion determination for each pixel. Such motion information is provided to module 716 for determining FPN correction terms.

Module 716 controls the operation of shutter 702 and performs the calculation of FPN correction terms. Module 716 controls actuator 703 to translate shutter 702 between open position 702A (e.g., where unshuttered images are captured) and closed position 702B (e.g., where partially shuttered images are captured). Module 716 receives these unshuttered and partially shuttered images and compares them to determine a FPN correction term (e.g., Y1 discussed above) for each pixel.

In some embodiments, module 716 may selectively calculate the FPN correction term for each pixel based on whether module 714 has determined that the pixel is associated with motion. In this regard, if module 714 has not detected motion for a particular pixel, then module 716 may use the unshuttered and partially shuttered images to calculate a FPN correction term for the pixel with high confidence because the pixel values of the unshuttered and partially shuttered images are associated with the same feature of scene 770 in this case.

However, if module 714 has detected motion for a particular pixel, then module 716 may choose to refrain from calculating a FPN correction term for the pixel, because the pixel values of the unshuttered and partially shuttered images may not be associated with the same feature of scene 770 in this case.

Module 716 may repeatedly cycle shutter 702 between open position 702A and closed position 702B as desired to calculate and/or update FPN correction terms for all pixels. Module 716 may also inform module 712 and/or module 714 when shutter 702 is in the closed position 702B so that module 712 and/or module 714 may apply an appropriate gain factor to the images to compensate for attenuation by shutter 702.

Module 716 provides the FPN correction terms to module 714 which applies them to the processed captured images. In some embodiments, module 716 may average the FPN correction terms over multiple calibration operations before providing the FPN correction terms to module 716. Module 716 may provide the resulting corrected images to other portions of system 100 and/or 700 for further processing, viewing, storage, and/or other uses.

Figure 8:
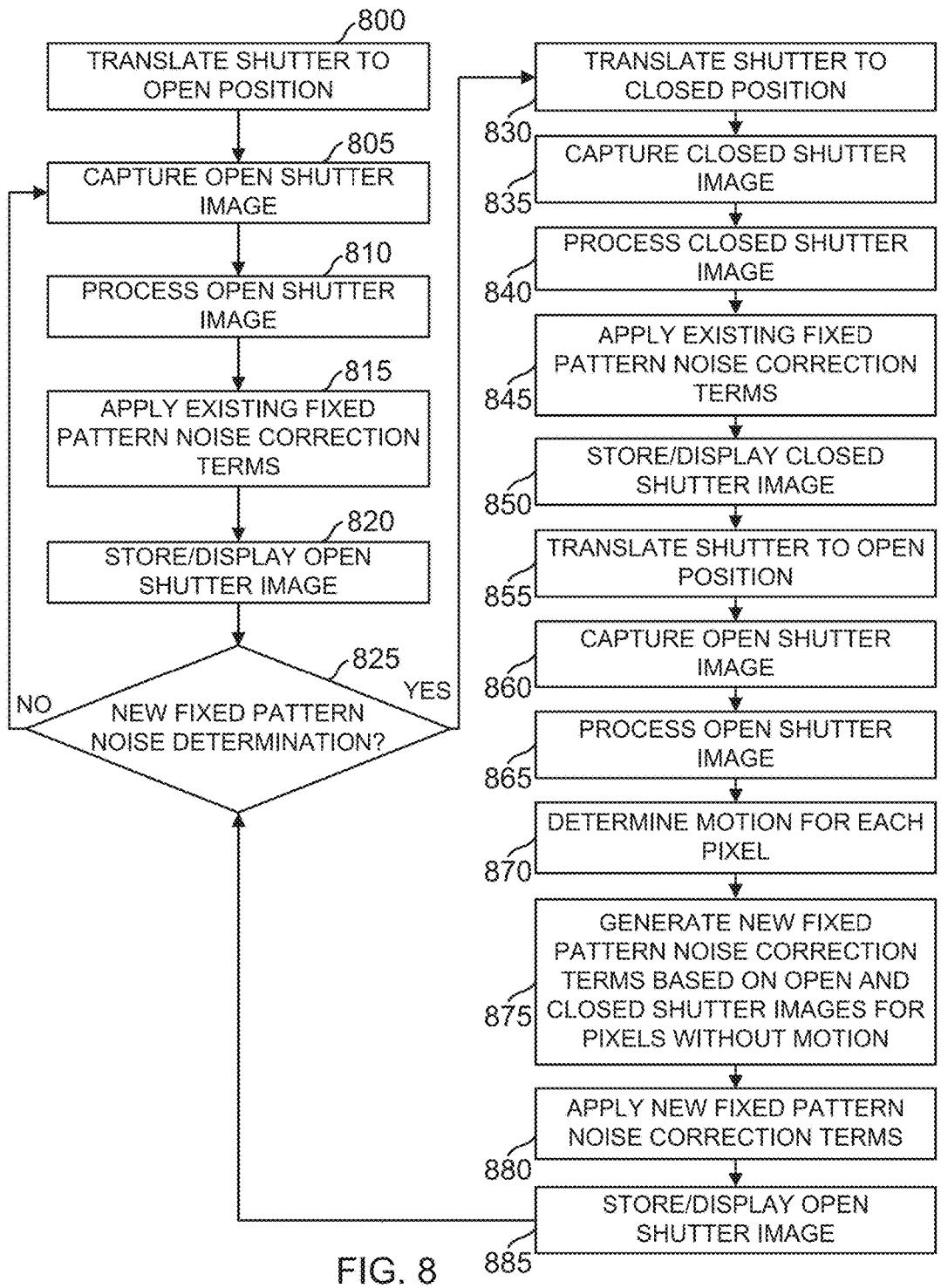
FIG. 8 illustrates a process of removing FPN using a shutter obstructing only a portion of an optical component in accordance with an embodiment of the disclosure.

FIG. 8 illustrates a process of removing FPN using partial shutter 702 of system 700 in accordance with an embodiment of the disclosure. In various embodiments, the process of FIG. 7 may be performed by processing component 710 used to control various components of system 700 and further used to process captured images.

As shown, FIG. 8 includes a main loop of blocks 800-825 that may be performed during normal operation of system 700. FIG. 8 also includes a calibration loop of blocks 830-885 that may be performed periodically and/or on demand to determine new or updated FPN correction terms.

In block 800, actuator 703 translates shutter 702 to open position 702A. In block 805, image capture component 730 captures one or more images while shutter 702 is maintained in open position 702A. In this regard, images captured in block 805 include pixel values determined by incident radiation 771 received from scene 770 (e.g., incident radiation 771A-C) without any attenuation by shutter 702, and further determined by FPN associated with system 700.

In block 810, processing component 710 (e.g., module 712 and/or module 714) performs various processing on the open shutter image including, for example, non-uniformity correction, gain correction, temporal noise filtering, low pass filtering (e.g., to remove high spatial frequency noise), and/or other processing as appropriate.

In block 815, processing component 710 (e.g., module 714) applies previously determined FPN correction terms, if any (e.g., generated by a previous iteration of block 875).

In block 820, processing component 710 stores the open shutter image, for example, in memory component 120 (shown in FIG. 1). In some embodiments, block 820 may further include processing component 710 displaying the open shutter image on display component 140 (shown in FIG. 1), for example, for realtime viewing of scene 770 by a user.

In block 825, processing component 710 (e.g., module 716) decides whether updated FPN correction terms should be determined. For example, in some embodiments, FPN correction terms may be calculated periodically and/or in response to conditions detected by components of system 700, the results of processing performed in block 810, and/or other criteria. If new or updated FPN correction terms are not to be calculated, then the process returns to block 805 where another open shutter image is captured. Otherwise, the process continues to block 830.

In block 830, actuator 703 translates shutter 702 to closed position 702B. In block 835, image capture component 730 captures one or more images while shutter 702 is maintained in closed position 702B. In this regard, at least a portion of incident radiation 771 will be blocked (e.g., incident radiation 771A and 771B). As a result, images captured in block 830 include pixel values determined by the unblocked portion of incident radiation 771 received from scene 770 (e.g., incident radiation 771B), and further determined by FPN associated with system 700.

In block 840, processing component 710 (e.g., module 712 and/or module 714) processes the closed shutter image as similarly discussed with regard to block 810. In particular, block 840 may include applying an appropriate gain factor to the closed shutter thermal image to compensate for attenuation of incident radiation 771 by shutter 702.

Also in block 840, additional filtering may be applied to the closed shutter thermal image to compensate for an increased signal to noise ratio. In this regard, because the incident radiation 771 is attenuated down to the remaining incident radiation 772 by shutter 702 during the closed shutter image capture of block 835, a larger proportion of the pixel values of the closed shutter image may be associated with FPN rather than desired scene information.

In block 845, processing component 710 (e.g., module 714) applies previously determined FPN correction terms, as discussed with regard to block 815. In this regard, although new FPN correction terms will be subsequently calculated in block 875, the existing FPN terms may be applied in block 845 to permit a user to view a corrected image while calibration is performed.

In block 850, processing component 710 stores the closed shutter image, for example, in memory component 120 (shown in FIG. 1). In some embodiments, block 845 may further include processing component 710 displaying the closed shutter image on display component 140 (shown in FIG. 1) before any new FPN correction terms have been determined, for example, for realtime viewing of scene 770 by a user even while shutter 702 is in closed position 702B. Moreover, in some embodiments, a gain factor may have already been applied during the processing of block 840 to compensate for the attenuation introduced by shutter 702 in relation to the partially shuttered image. Thus, the user may continue to view images of scene 770 in realtime even while calibration is performed and regardless of the position of shutter 702.

In block 855, actuator 703 translates shutter 702 to open position 702A. In block 860, image capture component 730 captures one or more images while shutter 702 is maintained in open position 702A as discussed with regard to block 805. In block 865, processing component 710 (e.g., module 712 and/or module 714) performs various processing on the open shutter image as discussed with regard to block 810.

In block 870, processing component 710 (e.g., module 714) performs a motion determination for each pixel based on a comparison between the open shutter images captured in blocks 805 and 835.

In block 875, processing component 710 (e.g., module 716) determines (e.g., isolates) the FPN currently associated with the open and closed shutter images and generates corresponding FPN correction terms (e.g., new or updated) for any of the pixels that do not exhibit motion (e.g., as determined in block 870).

For visible light images, as discussed with regard to equations 1-3, processing component 710 may determine the FPN for each pixel using pixel values of the open shutter image (e.g., including incident radiation 771A-C and FPN) and pixel values of the closed shutter image (e.g., after a gain factor has been applied to compensate for attenuation by shutter 702, thus including gain corrected incident radiation 771B from scene 170).

For thermal images, as discussed with regard to equations 3-6, processing component 710 may determine the FPN for each pixel using pixel values of the open shutter image (e.g., including incident radiation 771A-C and FPN), pixel values of the closed shutter image (e.g., after a gain factor has been applied to compensate for attenuation by shutter 702, thus including gain corrected incident radiation 771B from scene 170), and the known thermal radiation contribution from shutter 702 (e.g., ShutterDC).

In some embodiments where previous FPN correction terms have already been applied (e.g., in the processing performed by blocks 815 and 845), the FPN determined in block 875 may represent changes in the FPN over a previous FPN determination. As such, the FPN correction terms generated in block 875 may be used to adjust (e.g., operating as delta values) previously generated FPN correction terms.

In block 880, processing component 710 (e.g., module 714) applies the newly generated FPN correction terms to the open shutter image captured in block 860. As discussed, in some embodiments, the new FPN correction terms may be determined in block 875 for any of the pixels that do not exhibit motion. Thus, block 880 may include applying new FPN terms for pixels that currently do not exhibit motion and applying previous FPN terms for the remaining pixels.

In block 885, the open shutter image is stored and/or displayed in the manner discussed with regard to block 820. The process then returns to block 825 where the process may return to the main loop of blocks 800-825 or the calibration loop of blocks 830-885. In this regard, system 700 may repeat the calibration loop as desired to determine FPN correction terms for all pixels of the captured images (e.g., over time, it may be expected that all pixels will eventually exhibit a motionless state to permit associated FPN correction terms to be determined).

Other embodiments are also contemplated. For example, although various display operations have been discussed in relation to blocks 820, 850, and 885, these may be selectively rearranged, changed, and/or omitted as may be desired for particular applications, depending on the particular images desired to be viewed (e.g., open shutter images and closed shutter images with or without FPN correction terms applied). For example, in some embodiments, FPN can be removed from images stored and/or displayed while shutter 702 is closed without requiring calculation or application of FPN correction terms.

Figure 9A:
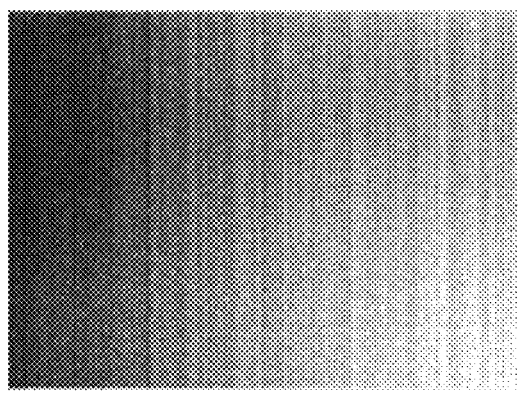
FIGS. 9A-C illustrate additional example thermal images in accordance with embodiments of the present disclosure.
Figure 9B:
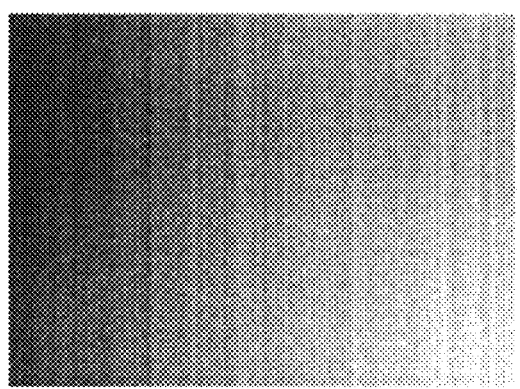
Figure 9C:
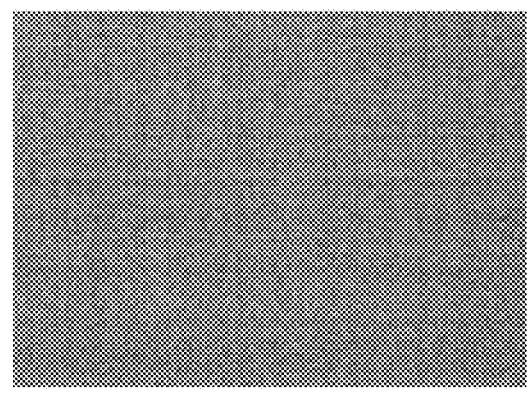

FIGS. 9A-C illustrate example thermal images illustrating the principles of equations 3-6 applied to system 700 in accordance with embodiments of the present disclosure. FIG. 9A illustrates an uncorrected thermal image 910 captured while shutter 702 is in open position 702A and without any FPN correction terms applied. In this regard, each pixel of thermal image 910 is a composite representation of the FPN associated with system 700 and the incident radiation 771 received from scene 770 without any attenuation by shutter 702. In particular, thermal image 910 includes FPN which is evidenced by vertical lines distributed across the image.

FIG. 9B illustrates a FPN thermal image 920 with each pixel representing the FPN (e.g., Y1) determined using equation 6 as previously discussed. The FPN vertical lines are even more apparent in thermal image 920, as most of the actual incident radiation 771 has been subtracted out.

FIG. 9C illustrates a corrected thermal image 930 captured while shutter 702 is in open position 702A and with FPN correction terms applied for all pixels based on the FPN in thermal image 920. As shown, the FPN lines have been largely eliminated in corrected thermal image 930.

In view of the various techniques described herein, it will be appreciated that FPN correction terms can be conveniently generated in real time without interfering with a user's ability to store and view images of scenes 170 and 670/770 in real time. For example, by using a semi-transparent shutter 102 and/or a partial shutter 602/702 as described, images of scenes 170 and 670/770 can continue to be captured, processed, stored, and viewed with no interruption (e.g., images can be continuously viewed, even while calibration is performed). Such continuous operation is particularly advantageous, for example, in automotive applications, military applications (e.g., rifle sights and guidance systems), and other high priority or high risk environments. As discussed, partial shutter 602/702 permits radiometric corrections to be performed while simultaneously providing user-viewable images.

As a result, in some embodiments, shutters 102 and 602/702 are not required to rapidly transition between open and closed positions and therefore may be implemented with slower actuators and lighter weight materials in comparison with conventional opaque shutters which rely on a complete blockage of an imaged scene and will always result in some scene information being lost. Moreover, because partial shutter 602/702 may be sized to block only a comparatively small portion of the optical path, shutter 602/702 may be conveniently maintained in a relatively small thermally isolated structure while in the open position.

The features and operations discussed with regard to systems 100 and 600, shutters 102 and 602/702, and other features identified herein may be selectively combined in various embodiments as appropriate for particular implementations and applications.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:
1. A system comprising:
an image capture component configured to capture images in response to incident radiation from a scene along an optical path;

a shutter configured to attenuate a first portion of the incident radiation and permit a second portion of the incident radiation to pass;

an actuator configured to translate the shutter between an open position out of the optical path, and a closed position in the optical path between the scene and the image capture component; and a processor configured to determine a plurality of fixed pattern noise (FPN) correction terms using images of the scene captured by the image capture component while the shutter is in the open and closed positions.

2. The system of claim 1, wherein the processor is configured to apply the FPN correction terms to provide a user-viewable FPN corrected image of the scene.

3. The system of claim 1, wherein the processor is configured to apply a gain factor to one of the images captured while the shutter is in the closed position to compensate for the attenuation to provide a user-viewable gain corrected image of the scene while the shutter is in the closed position.

4. The system of claim 1, wherein the shutter is a semi-transparent shutter comprising a semi-transparent material configured to attenuate the first portion of the incident radiation and pass the second portion of the incident radiation.

5. The system of claim 4, wherein the semi-transparent material comprises:
a thickness in a range from approximately 0.012 to approximately 0.005 inches or less; and
ultra-high molecular weight polyethylene (UHMWPE) and/or very-high molecular weight polyethylene (VHMWPE).

6. The system of claim 1, further comprising:
an optical component disposed between the scene and the image capture component; and
wherein the shutter is a partial shutter comprising a blocking portion configured to attenuate the first portion of the incident radiation and configured to block only a portion of the optical path when the shutter is in the closed position between the optical component and the scene.

7. The system of claim 1, wherein the images comprise a plurality of pixels having associated pixel values captured by a plurality of sensors of the image capture component arranged in a plurality of rows and columns, wherein each FPN correction term is associated with a corresponding one of the pixels.

8. The system of claim 7, wherein the processor is configured to detect motion associated with each pixel by comparing pixel values of the same pixel for at least a subset of the images, wherein the FPN terms are determined for a subset of the pixels not associated with motion.

9. The system of claim 1, wherein the shutter is configured to attenuate approximately 5% to approximately 95% of the incident radiation while in the closed position.

10. The system of claim 1, wherein the incident radiation is thermal radiation and/or visible light radiation, wherein the processor is configured to perform a radiometric correction using the thermal radiation.

11. A method comprising:
receiving incident radiation from a scene along an optical path;
translating a shutter between an open position out of the optical path and a closed position in the optical path between the scene and an image capture component, wherein the shutter is configured to attenuate a first portion of the incident radiation and permit a second portion of the incident radiation to pass;
capturing, by the image capture component, images of the scene in response to the received incident radiation while the shutter is in the open and closed positions; and
determining a plurality of fixed pattern noise (FPN) correction terms using the images.

12. The method of claim 11, further comprising applying the FPN correction terms to provide a user-viewable FPN corrected image of the scene.

13. The method of claim 11, further comprising applying a gain factor to one of the images captured while the shutter is in the closed position to compensate for the attenuation to provide a user-viewable gain corrected image of the scene while the shutter is in the closed position.

14. The method of claim 11, wherein the shutter is a semi-transparent shutter comprising a semi-transparent material configured to attenuate the first portion of the incident radiation and pass the second portion of the incident radiation.

15. The method of claim 14, wherein the semi-transparent material comprises:
a thickness in a range from approximately 0.012 to approximately 0.005 inches or less; and
ultra-high molecular weight polyethylene (UHMWPE) and/or very-high molecular weight polyethylene (VHMWPE).

16. The method of claim 11, wherein the shutter is a partial shutter comprising a blocking portion configured to attenuate the first portion of the incident radiation and configured to block only a portion of the optical path when the shutter is in the closed position between an optical component and the scene, wherein the optical component is disposed between the scene and the image capture component.

17. The method of claim 11, wherein the images comprise a plurality of pixels having associated pixel values captured by a plurality of sensors of the image capture component arranged in a plurality of rows and columns, wherein each FPN correction term is associated with a corresponding one of the pixels.

18. The method of claim 17, further comprising detecting motion associated with each pixel by comparing pixel values of the same pixel for at least a subset of the images, wherein the FPN terms are determined for a subset of the pixels not associated with motion.

19. The method of claim 11, wherein the shutter is configured to attenuate approximately 5% to approximately 95% of the incident radiation while in the closed position.

20. The method of claim 11, wherein the incident radiation is thermal radiation and/or visible light radiation, the method further comprising performing a radiometric correction using the thermal radiation.

* * * * *

UNITED STATES PATENT AND TRADEMARK OFFICE
CERTIFICATE OF CORRECTION

PATENT NO. : 10,321,076 B2
APPLICATION NO. : 15/710729
DATED : June 11, 2019
INVENTOR(S) : Sam Grigorian, Nicholas Högasten and Pierre Boulanger It is certified that error appears in the above-identified patent and that said Letters Patent is hereby corrected as shown below:

In the Specification

In Column 10, Line 57, change "(ROTC)" to --(ROIC)--.

In Column 13, Lines 1 - 2, change "component 110 perform. In various" to --component 110 performs various--.

Signed and Sealed this
Fifth Day of May, 2020

Andrei Iancu
*Director of the United States Patent and Trademark Office*